June 17, 1958    R. H. BERGSTAD ET AL    2,838,848
TACTICAL TRAINING DEVICE FOR SIMULATING RADAR DISPLAYS
Filed Jan. 27, 1953

INVENTORS.
Ralph H. Bergstad.
BY Donald O. Butler.

A. R. McCrady
ATTORNEYS.

United States Patent Office 2,838,848
Patented June 17, 1958

2,838,848

TACTICAL TRAINING DEVICE FOR SIMULATING RADAR DISPLAYS

Ralph H. Bergstad and Donald D. Butler, San Diego, Calif., assignors to the United States of America as represented by the Secretary of the Navy Application January 27, 1953, Serial No. 333,624

1 Claim. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates to a training device and more particularly to a tactical training device in which moving points of light projected on a screen as detected by a television camera and presented on a cathode ray tube are utilized to simulate radar displays.

The great expense of training radar operators and combat information center teams under actual operating conditions makes it desirable to use training devices which will simulate radar displays. It is important in such apparatus that the presentation be as realistic as possible. Mechanical methods in which models are manually moved on a chart have proven unsatisfactory. The electronic trainers heretofore employed have not been capable of providing a representation of a number of ships simultaneously with the viewers' ship always centered on the screen unless very complicated circuitry is incorporated in the devices. In the instant invention, a plurality of points of light representing vessels are projected on a screen. A commercial television camera associated with each light source scans the screen and provides a signal which is fed into a viewing cathode ray tube. The display of the cathode ray tube has a centered light area representing "own ship" and other light areas representing pips from other ships. By moving the light sources, relative motion of the various craft is realistically simulated.

An object of the invention is to provide an improved training apparatus wherein points of light on a screen are viewed by a television camera and presented on a cathode ray tube to simulate a radar display.

Other objects and many of the attendant advantages of this invention will be readily appreciated as the same becomes better understood by reference to the following description.

Figure 1:
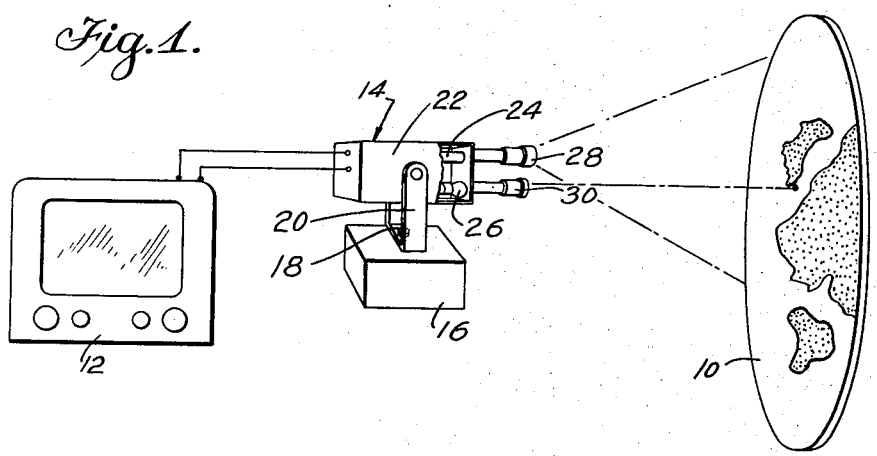
Figure 2:
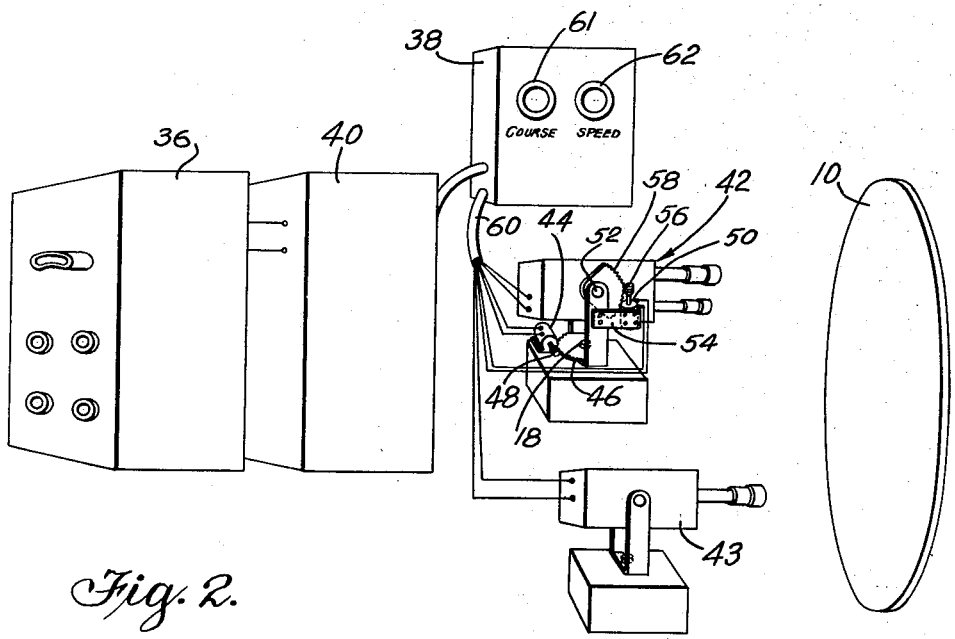

Fig. 1 is a perspective view of a single unit of a training apparatus embodying the invention; and Fig. 2 is a similar view of another form of apparatus embodying the invention.

The apparatus shown in Fig. 1 comprises a projection screen 10, a conventional television receiver 12, and camera assembly 14. Assembly 14 includes base 16, vertical pivot pin 18, support gimbal 20, and housing 22, shown partly in section, which contains the scanning tube 24 and light source 26. Housing 22 supports the image forming optical system 28 associated with tube 24 and also condensing lens system 30 which projects the light produced by source 26 upon screen 10. The housing also contains the required circuits such as the video amplifier for tube 24. Tube 24 is preferably of the commercially available Vericon or Videcon type which, with the beam forming circuits and power supply, occupies relatively little space. The larger types of television cameras perform satisfactorily but are not suitable where space is at a premium as on board ship. Light source 26 is preferably of the readily available miniature electric arc bulbs.

A two-watt point light source projected on the screen is very satisfactory for training purposes; other types of light sources which may be focused to project a spot of light of the desired size on the screen are also satisfactory. A representation of a map or portion of the surface of the earth may be painted or otherwise affixed to screen 10.

In the operation of the above described training apparatus, the instructor manually controls the position of camera assembly 14 in such manner that the point of light projected by source 26 will be on screen 10. Since optical system 28 and tube 24 are maintained in fixed, aligned relation with respect to light source 26, the presentation on the cathode ray tube of television receiver 12 will be very similar to the PPI display of radar equipment in which the viewers' own ship is maintained at the center of the screen. By modifying the parallel alignment of the light system and the scanning system, an off-center display may be simulated. It is obvious that other points of light may be projected on screen 10 to represent relative movement between the own ship pip in the center of the viewing cathode ray tube screen and the pips from other objects. Some or all of these other light sources may be associated with additional cameras thus making it possible to give instruction to a number of trainees simultaneously. Each camera tube may provide a signal to one or more cathode ray viewing tubes.

The apparatus shown in Fig. 2 comprises a projection screen 10, a PPI radar equipment 36, control unit 38, converter 40, camera assembly 42 and projector 43. The camera assembly is generally similar to that shown in Fig. 1 with the addition of actuating motor 44 which is effective to rotate assembly 42 on pivot 18 through worm gear segment 46 and worm 48. Actuating motor 50 is mounted on bracket 54 and positioned effective to rotate assembly 42 on pivot pin 52 through the action of worm 56 affixed to the shaft of motor 50 and worm gear segment 58 which is affixed to assembly 42. Power to actuate motors 44 and 50 and to operate the camera tube and light source is supplied from the control unit through wires in conduit 60. Control unit 38 performs the function of regulating current flow through motors 44 and 50 in order that the motion of the projected point of light across screen 10 will simulate a moving object. The output of the control unit to motors 44 and 50 to give a course and speed indication is adjusted by means of dials 61 and 62. Control unit 38 may conveniently be a commercially available course data computer generator. If desired, the outputs of the control unit may be recorded by a conventional dead reckoning tracer (DRT) to simulate the recording of actual performance of a ship, for example, and to permit analysis of completed problems and illustrations which have been presented by means of the device. Although a television receiver display is satisfactory for most applications, it is often desirable to present the information on actual radar equipment to familiarize trainees with equipment and to practice range determinations. The raster scan of camera tube 42 does not correspond to the polar scan of the usual PPI radar so a conversion must be made. Converter 40, which carries out the transformation, may include graphechon tubes or other well known circuits and tubes. A graphechon circuit includes an electrostatic-charge storage tube having two coaxial electron guns located on opposite sides of the storage target. The circuit was designed to convert from radian scan to raster scan, but by using external deflection yokes and reversing connections it will serve to convert from raster scan to polar scan. Projector 43 is positioned effective to project on screen 10 any desired representation such as, for example, a land mass. The projected image is picked up by camera 42 and appears on the viewing screen as a typical radar display of a land mass about which will be various single pips representing ships and aircraft. Screen 10 may be plane or it may be concave to lessen the distortion in the relative speed of the moving point of light as it approaches the edge of the screen.

Obviously many modifications and variations of the present invention are possible in the light of the above teachings. It is therefore to be understood that within the scope of the appended claim the invention may be practiced otherwise than as specifically described.

What is claimed is:

A tactical training device comprising a projection screen, a television camera adapted to view said screen, a first light source adapted to project a point of light on said screen, means to secure said light source rigidly to and in alignment with said camera, actuating means effective in response to an electric current to vary the position of the point of light on said screen by moving said camera, a converter effective to convert the raster scan signal output of said camera to a polar scan signal, a radar adapted to receive the polar scan signal from said converter, a projector adapted to project an image on said screen, and control means effective to supply electric current to said actuating means.

References Cited in the file of this patent

UNITED STATES PATENTS

| | | |
|---|---|---|
| 1,918,206 | Ermisch | July 11, 1933 |
| 1,969,852 | Markosek | Aug. 14, 1934 |
| 2,060,670 | Hartman | Nov. 10, 1936 |
| 2,164,297 | Bedford | June 27, 1939 |
| 2,282,045 | Fleischer | May 5, 1942 |
| 2,392,142 | Grosswiller | Jan. 1, 1946 |
| 2,405,591 | Mason | Aug. 13, 1946 |
| 2,406,751 | Emerson | Sept. 3, 1946 |
| 2,417,446 | Reynolds | Mar. 18, 1947 |
| 2,428,627 | Kalman | Oct. 7, 1947 |
| 2,516,069 | Newhouse et al. | July 18, 1950 |
| 2,676,243 | Myers | Apr. 20, 1954 |